(12) United States Patent
Dannoux

(10) Patent No.: US 11,608,288 B2
(45) Date of Patent: Mar. 21, 2023

(54) METHODS AND APPARATUS FOR PRESSING GLASS OR GLASS-CERAMIC PREFORMS TO FORM SHAPED PLATES, METHODS FOR MANUFACTURING LIQUID LENSES, AND LIQUID LENSES

(71) Applicant: CORNING INCORPORATED, Corning, NY (US)

(72) Inventor: Thierry Luc Alain Dannoux, Avon (FR)

(73) Assignee: CORNING INCORPORATED, Corning, NY (US)

( * ) Notice: Subject to any disclaimer, the term of this patent is extended or adjusted under 35 U.S.C. 154(b) by 373 days.

(21) Appl. No.: 16/754,661

(22) PCT Filed: Oct. 12, 2018

(86) PCT No.: PCT/US2018/055615
§ 371 (c)(1),
(2) Date: Apr. 8, 2020

(87) PCT Pub. No.: WO2019/075330
PCT Pub. Date: Apr. 18, 2019

(65) Prior Publication Data
US 2020/0354254 A1 Nov. 12, 2020

Related U.S. Application Data

(60) Provisional application No. 62/572,161, filed on Oct. 13, 2017.

(51) Int. Cl.
*C03B 23/00* (2006.01)
*G02B 3/12* (2006.01)

(52) U.S. Cl.
CPC ............ *C03B 23/0013* (2013.01); *G02B 3/12* (2013.01)

(58) Field of Classification Search
CPC .... G02B 7/023; G02B 3/0012; G02B 3/0062; G02B 3/0025; G02B 3/0056;
(Continued)

(56) References Cited

U.S. PATENT DOCUMENTS 4,606,750 A   8/1986   Torii et al.
4,969,944 A   11/1990  Marechal et al.
(Continued)

FOREIGN PATENT DOCUMENTS

CN   1077289 A   10/1993
CN   1743165 A   3/2006
(Continued)

OTHER PUBLICATIONS

International Search Report and Written Opinion of the International Searching Authority; PCT/US2018/055615; dated Jan. 16, 2019; 13 Pages; European Patent Office.
(Continued)

*Primary Examiner* — Mustak Choudhury

(57) ABSTRACT

A method includes pressing a preform with a mold including a mold body and a plurality of mold protrusions extending from the mold body at a pressing temperature and a pressing pressure sufficient to transform the preform into a shaped article including a plurality of cavities corresponding to the plurality of mold protrusions. The preform is formed from a glass material, a glass-ceramic material, or a combination thereof. The mold body is formed from a porous material. The plurality of mold protrusions is formed from a nonporous material.

18 Claims, 11 Drawing Sheets

(58) Field of Classification Search
CPC .......... G02B 3/0031; G02B 3/12; G02B 3/14; G02B 13/001; G02B 13/0075; G02B 13/0085; B29D 11/00; B29D 11/00298; B29D 11/00596; B29C 43/36; B29C 43/203; C03B 23/0013; C03B 23/22; C03B 11/08; C03B 11/082; C03B 11/086; C03B 11/12; C04B 41/88; C04B 41/5133; C04B 41/009; C04B 41/0027; C04B 35/00

See application file for complete search history.

(56) References Cited

U.S. PATENT DOCUMENTS

| | | | |
|---|---|---|---|
| 5,013,348 | A | 5/1991 | Hirota |
| 5,346,523 | A | 9/1994 | Sugai et al. |
| 6,081,388 | A | 6/2000 | Widl |
| 6,305,194 | B1 | 10/2001 | Budinski et al. |
| 6,560,994 | B1 * | 5/2003 | Hirota .................. C03B 11/082 65/102 |
| 6,624,948 | B1 * | 9/2003 | Miller .................... C03B 11/08 359/619 |
| 7,172,202 | B2 | 2/2007 | Kubota et al. |
| 7,383,697 | B2 | 6/2008 | Hosoe et al. |
| 7,515,350 | B2 | 4/2009 | Berge et al. |
| 7,791,814 | B2 | 9/2010 | Liogier D'ardhuy et al. |
| 7,940,467 | B2 | 5/2011 | Berge et al. |
| 8,156,762 | B2 | 4/2012 | Dannoux et al. |
| 8,649,102 | B2 | 2/2014 | Berge et al. |
| 8,922,901 | B2 | 12/2014 | Karam et al. |
| 9,201,174 | B2 | 12/2015 | Karam et al. |
| 2005/0126226 | A1 * | 6/2005 | Winters ................... C04B 41/88 65/102 |
| 2006/0065546 | A1 | 3/2006 | Curodeau |
| 2010/0012288 | A1 | 1/2010 | Marsden et al. |
| 2010/0071416 | A1 | 3/2010 | Kawai |
| 2013/0061446 | A1 * | 3/2013 | Wang ..................... G02B 7/023 29/700 |
| 2013/0239617 | A1 | 9/2013 | Dannoux |
| 2014/0347741 | A1 * | 11/2014 | Karam ................ G02B 26/005 216/26 |
| 2015/0070779 | A1 | 3/2015 | Karam et al. |
| 2015/0131161 | A1 | 5/2015 | Lee et al. |
| 2020/0180991 | A1 | 6/2020 | Boek et al. |

FOREIGN PATENT DOCUMENTS

| | | |
|---|---|---|
| CN | 101558332 A | 10/2009 |
| CN | 101668710 A | 3/2010 |
| CN | 102162865 A | 8/2011 |
| CN | 102555142 A | 7/2012 |
| CN | 103080779 A | 5/2013 |
| CN | 106923458 A | 7/2017 |
| EP | 1662276 A1 | 5/2006 |
| EP | 1884805 A1 | 2/2008 |
| EP | 1964817 A1 | 9/2008 |
| EP | 2009468 A1 | 12/2008 |
| EP | 2911990 A1 | 9/2015 |
| JP | 06-293528 A | 10/1994 |
| JP | 2013067544 A | 4/2013 |
| KR | 1374590 B1 | 3/2014 |
| WO | 2008015164 A1 | 2/2008 |
| WO | 2010/073127 A2 | 7/2010 |
| WO | 2014/066335 A1 | 5/2014 |
| WO | 2018/200916 A1 | 11/2018 |

OTHER PUBLICATIONS

Poco Graphite an Entegreis Company; "Properties and Characteristics of Graphite"; (2015) 42 Pages.
LMT Tools; "Bell Tool"; 8 Pages; 2019 https://www.lmt-tools.com/en/products/advanced-tooling/.
"Standard Terminology Relating to Manufactured Carbon and Graphite", In ASTM C709, 2003, 3 pages.
ISO 7991:1987 "Glass—Determination of coefficient of mean linear thermal expansion", First edition, Dec. 1987, pp. 10.
Chinese Patent Application No. 201880066730.8, Office Action dated Sep. 16, 2021, 19 pages (5 pages of English Translation and 14 pages of Original Document), Chinese Patent Office.
Boswell Brian et al: "A review of micro-mechanical cutting", The International Journal of Advanced Manufacturing Technology, Springer, London, vol. 94, No. 1, Aug. 18, 2017 (Aug. 18, 2017), pp. 789-806.
Chinese Patent Application No. 201880066730.8, Office Action dated Mar. 15, 2022, 4 pages of English Translation, Chinese Patent Office.

* cited by examiner

METHODS AND APPARATUS FOR PRESSING GLASS OR GLASS-CERAMIC PREFORMS TO FORM SHAPED PLATES, METHODS FOR MANUFACTURING LIQUID LENSES, AND LIQUID LENSES

CROSS-REFERENCE TO RELATED APPLICATIONS

This application claims the benefit of priority under 35 U.S.C. § 371 of International Application No. PCT/US2018/055615, filed on Oct. 12, 2018, which claims the benefit of priority under 35 U.S.C. § 119 of U.S. Provisional Application No. 62/572,161, filed Oct. 13, 2017, the content of each of which is incorporated herein by reference in its entirety.

BACKGROUND

Field

This disclosure relates to methods and apparatus for pressing glass or glass-ceramic preforms to form shaped articles, which can be used to manufacture liquid lenses.

Technical Background

Isothermal glass pressing generally includes pressing a glass plate at a relatively low temperature (e.g., a temperature at which the glass has a relatively high viscosity of $10^{10}$ poise to $10^{12}$ poise) using a polished ceramic or metallic mold. Such high viscosity of the glass helps to prevent the glass from sticking to the mold and to maintain the surface quality of the finished article. The mold complexity and relatively high pressing force generally limits isothermal glass pressing to small glass articles with simple geometries (e.g., ophthalmic lenses).

SUMMARY

Disclosed herein are methods and apparatus for pressing glass or glass-ceramic preforms to form shaped articles, which can be used to manufacture liquid lenses and to liquid lenses incorporating such shaped articles.

Disclosed herein is a method comprising pressing a preform with a mold comprising a mold body and a plurality of mold protrusions extending from the mold body at a pressing temperature and a pressing pressure sufficient to transform the preform into a shaped article comprising a plurality of cavities corresponding to the plurality of mold protrusions. The preform comprises a glass material, a glass-ceramic material, or a combination thereof. The mold body comprises a porous material. The plurality of mold protrusions comprise a non-porous material.

Disclosed herein is an apparatus for pressing a plurality of cavities in a preform, the apparatus comprising a mold body comprising a porous material and a plurality of mold protrusions extending from the mold body and comprising a non-porous material.

Disclosed herein is a shaped article comprising a plate comprising a glass material, a glass-ceramic material, or a combination thereof and a plurality of cavities formed in the plate. An unpolished sidewall of each of the plurality of cavities has a surface roughness of less than or equal to 120 nm.

Disclosed herein is a liquid lens comprising a lens body comprising a first window, a second window, and a cavity disposed between the first window and the second window. A first liquid and a second liquid are disposed within the cavity of the lens body. The first liquid and the second liquid are substantially immiscible with each other and have different refractive indices such that an interface between the first liquid and the second liquid forms a lens. A sidewall of the cavity has a surface roughness of less than or equal to 120 nm.

Disclosed herein is a method of manufacturing a liquid lens, the method comprising pressing a preform with a mold comprising a mold body and a plurality of mold protrusions extending from the mold body at a pressing temperature and a pressing pressure sufficient to transform the preform into a shaped plate comprising a plurality of cavities corresponding to the plurality of mold protrusions. The preform comprises a glass material, a glass-ceramic material, or a combination thereof. The mold body comprises a porous material. The plurality of mold protrusions comprises a non-porous material. A first liquid and a second liquid are deposited in each of the plurality of cavities of the shaped plate. The first liquid and the second liquid are substantially immiscible with each other and have different refractive indices such that an interface between the first liquid and the second liquid forms a lens. A cap is bonded to a surface of the shaped plate to seal the first liquid and the second liquid within the plurality of cavities of the shaped plate and form a liquid lens array.

It is to be understood that both the foregoing general description and the following detailed description are merely exemplary, and are intended to provide an overview or framework to understanding the nature and character of the claimed subject matter. The accompanying drawings are included to provide a further understanding and are incorporated in and constitute a part of this specification. The drawings illustrate one or more embodiment(s), and together with the description, serve to explain principles and operation of the various embodiments.

DETAILED DESCRIPTION

Figure 1:
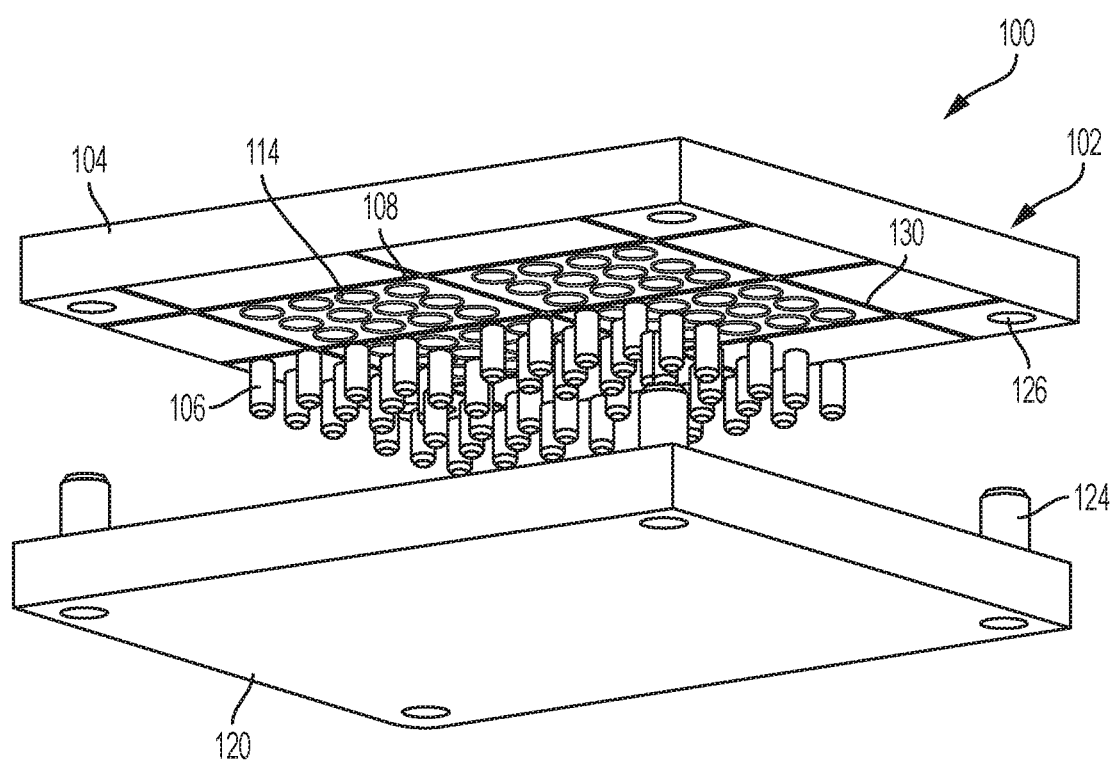
FIG. 1 is a perspective view of some embodiments of an apparatus that can be used to press a plurality of cavities in a preform.

Reference will now be made in detail to exemplary embodiments which are illustrated in the accompanying drawings. Whenever possible, the same reference numerals will be used throughout the drawings to refer to the same or like parts. The components in the drawings are not necessarily to scale, emphasis instead being placed upon illustrating the principles of the exemplary embodiments.

Numerical values, including endpoints of ranges, can be expressed herein as approximations preceded by the term "about," "approximately," or the like. In such cases, other embodiments include the particular numerical values. Regardless of whether a numerical value is expressed as an approximation, two embodiments are included in this disclosure: one expressed as an approximation, and another not expressed as an approximation. It will be further understood that an endpoint of each range is significant both in relation to another endpoint, and independently of another endpoint.

As used herein, the term "surface roughness" means Ra surface roughness determined as described in ISO 25178, Geometric Product Specifications (GPS)—Surface texture: areal, filtered at 25 μm.

As used herein, the term "non-stick," when used in reference to a material from which a mold surface is formed, can mean that there is no substantial formation of an oxide layer at the interface between a glass material, a glass-ceramic material, or a combination thereof with the mold surface at a temperature at which the glass material, the glass-ceramic material, or the combination thereof has a viscosity of $10^8$ poise. Additionally, or alternatively, the term "non-stick," when used in reference to a material from which a mold surface is formed, can mean that the diffusion of any component of a glass material, a glass-ceramic material, or a combination thereof from the interface between the glass material, the glass-ceramic material, or the combination thereof with the mold surface into the mold surface at a temperature at which the glass material, the glass-ceramic material, or the combination thereof has a viscosity of $10^8$ poise is limited to a depth of 1 nm.

As used herein, the term "formed from" can mean one or more of comprises, consists essentially of, or consists of. For example, a component that is formed from a particular material can comprise the particular material, consist essentially of the particular material, or consist of the particular material.

In various embodiments, a method comprises pressing a preform with a mold comprising a mold body and a plurality of mold protrusions extending from the mold body at a pressing temperature and a pressing pressure sufficient to transform the preform into a shaped article comprising a plurality of cavities corresponding to the plurality of mold protrusions. In some embodiments, the preform comprises a glass material, a glass-ceramic material, or a combination thereof. Additionally, or alternatively, the mold body comprises, consists essentially of, or consists of a non-stick and/or porous material, such as graphite. Additionally, or alternatively, the plurality of mold protrusions comprise, consist essentially of, or consist of a non-stick and/or non-porous material, such as glass-like carbon.

In various embodiments, an apparatus for pressing a plurality of cavities in a preform comprises a mold body comprising a non-stick and/or porous material, such as graphite, and a plurality of mold protrusions extending from the mold body and comprising a non-stick and/or non-porous material, such as glass-like carbon.

The methods and apparatus described herein can enable pressing of relatively large preforms at relatively low pressing pressures to form shaped articles having cavities with reduced sidewall roughness compared to conventional pressing methods and apparatus.

The methods and apparatus described herein can be used to manufacture shaped articles with smooth cavities formed therein. For example, in various embodiments, a shaped article comprises a plate comprising a glass material, a glass-ceramic material, or a combination thereof, and a plurality of cavities formed in the plate. An unpolished sidewall of each of the plurality of cavities has a surface roughness of less than or equal to 120 nm.

The methods and apparatus descried herein can be used to manufacture liquid lenses. For example, in various embodiments, a liquid lens comprises a lens body comprising a first window, a second window, and a cavity disposed between the first window and the second window. A first liquid and a second liquid are disposed within the cavity of the lens body. For example, the first liquid and the second liquid are substantially immiscible with each other and have different refractive indices such that an interface between the first liquid and the second liquid forms a lens. In some embodiments, a sidewall of the cavity has a surface roughness of less than or equal to 120 nm.

In various embodiments, a method of manufacturing a liquid lens comprises pressing a preform with a mold comprising a mold body and a plurality of mold protrusions extending from the mold body at a pressing temperature and a pressing pressure sufficient to transform the preform into a shaped plate comprising a plurality of cavities corresponding to the plurality of mold protrusions. In some embodiments, the preform comprises a glass material, a glass-ceramic material, or a combination thereof. Additionally, or alternatively, the mold body comprises, consists essentially of, or consists of a non-stick and/or porous material, such as graphite. Additionally, or alternatively, the plurality of mold protrusions comprise, consist essentially of, or consist of a non-stick and/or non-porous material, such as glass-like carbon. In some embodiments, a first liquid and a second liquid are deposited in each of the plurality of cavities of the shaped plate. For example, the first liquid and the second liquid are substantially immiscible with each other and have different refractive indices such that an interface between the first liquid and the second liquid forms a lens. In some embodiments, a cap is bonded to a surface of the shaped plate to seal the first liquid and the second liquid within the plurality of cavities of the shaped plate and form a liquid lens array.

Figure 2:
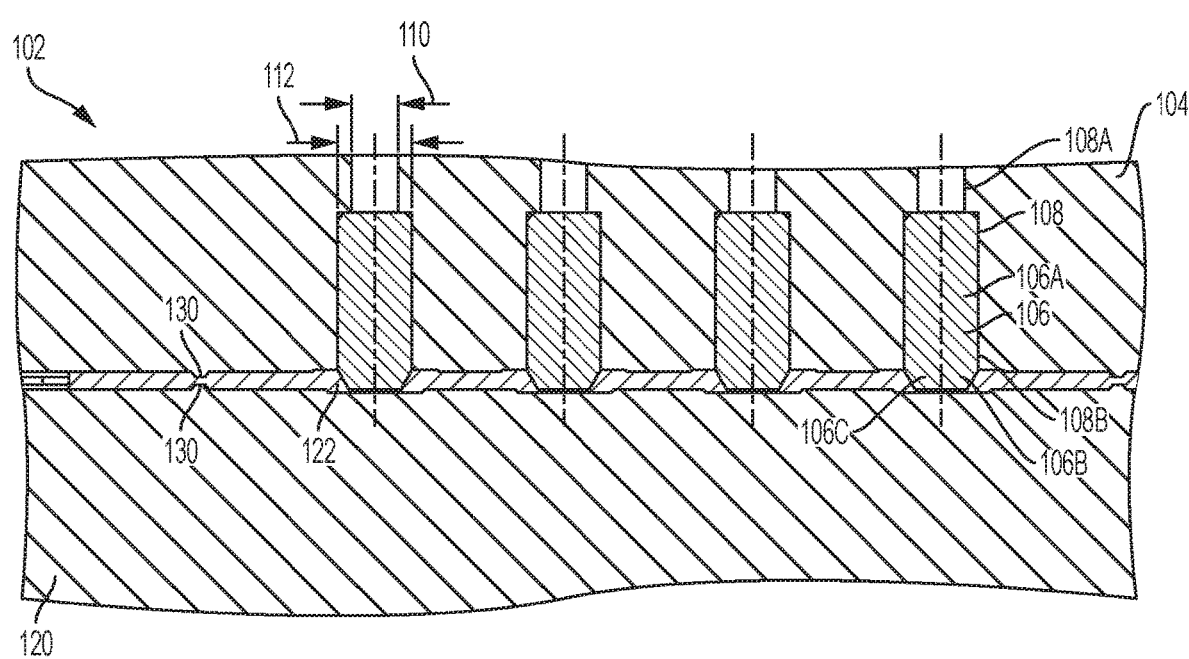
FIG. 2 is a schematic cross-sectional view of the apparatus of FIG. 1 and a preform during pressing.

FIG. 1 is a perspective view of some embodiments of an apparatus 100 that can be used to press a plurality of cavities in a preform as described herein, and FIG. 2 is a schematic cross-sectional view of apparatus 100. In some embodiments, apparatus 100 comprises a mold 102. For example, mold 102 comprises a mold body 104 and a plurality of mold protrusions 106 extending from the mold body as shown in FIGS. 1 and 2. Mold body 104 and mold protrusions 106 cooperatively define a mold surface to be engaged with the preform during pressing as described herein.

In some embodiments, mold body 104 is formed from a non-stick and/or porous material. For example, mold body 104 is formed from a graphite material having an open porosity of at least about 2%, at least about 3%, at least about 4%, at least about 5%, or at least about 10%. One potentially suitable graphite material is graphite grade 2020 commercially available from Mersen SA (Gambetta, France). In some embodiments, mold protrusions 106 are formed from a non-stick and/or non-porous material. For example, mold protrusions 106 are formed from a glass-like carbon material. One potentially suitable glass-like carbon material is vitrious carbon commercially available from Mersen SA (Gambetta, France). For example, the International Union of Pure and Applied Chemistry (IUPAC) defines glass-like carbon as "[a]n agranular non-graphitizable carbon with a very high isotropy of its structural and physical properties and with a very low permeability for liquids and gases." Other suitable non-stick and/or non-porous materials can include, for example, a tungsten carbide material (e.g., a low cobalt tungsten carbide material with a cobalt content of about 4% or less), a zirconia material, a zirconia yttrium material (e.g., yttria-stabilized zirconia or YSP or YTZP), or combinations thereof.

Forming mold body 104 from the porous material can enable the mold body to have a large mold surface. For example, in some embodiments, the mold surface has an area (e.g., an area defined within a perimeter of the mold surface) of at least about 100 cm², at least about 200 cm², at least about 300 cm², at least about 400 cm², at least about 500 cm², at least about 750 cm², or at least about 1000 cm². Such a large mold surface can be difficult to manufacture using non-porous materials, which can be difficult to machine using conventional diamond tooling. Forming mold protrusions 106 from the non-porous material can enable the mold protrusions to have smooth engaging portions as described herein. For example, the engaging portions of mold protrusions 106 can be formed by micro-grinding and/or finished (e.g., using a tribofinishing or another suitable finishing technique) to achieve the desired smoothness. Such smoothness can be difficult to achieve using porous materials. For example, a surface roughness that can be achieved by machining graphite having a relatively small grain size of 0.5 μm to 1 μm and less than 3% open porosity can be limited to about 0.2 μm to about 0.3 μm.

In some embodiments, the mold protrusions are configured as inserts or pins that are received within the mold body to form the mold. For example, mold body 104 comprises a plurality of openings 108, and each of the plurality of mold protrusions 106 is received within a corresponding one of the plurality of openings in the mold body as shown in FIGS. 1 and 2. Thus, each mold protrusion 106 comprises a shank portion 106A disposed within the corresponding opening 108 in mold body 104 and an extension portion 106B disposed outside the corresponding opening in the mold body and extending from the mold body. Extension portion 106B can be used to engage a preform to form cavities in the preform corresponding to the size and shape of the extension portion as described herein.

In some embodiments, shank portion 106A of mold protrusion 106 and opening 108 of mold body 104 have substantially the same cross-sectional shape to enable the shank portion to be received within the opening as described herein. For example, in the embodiments shown in FIGS. 1 and 2, shank portion 106A and opening 108 have a circular cross-sectional shape. In other embodiments, the shank portion and the opening can have a triangular, rectangular, elliptical, or other polygonal or non-polygonal shape. In some embodiments, a width or diameter of shank portion 106A of mold protrusion 106 is substantially the same as a width or diameter of opening 108 of mold body 104. For example, the width or diameter of shank portion 106A is at most about 5 μm larger than the width or diameter of opening 108. Such sizing can enable an interference fit between mold protrusion 106 and mold body 104. For example, mold protrusion 106 and opening 108 are sized to achieve about 5 μm to about 10 μm of compression upon introducing shank portion 106A of the mold protrusion into the opening.

In some embodiments, the openings in the mold body are configured as stepped openings. For example, opening 108 in mold body 104 comprises a narrow portion 108A and a wide portion 108B. The terms "narrow" and "wide" are relative terms, meaning that a width or diameter 110 of narrow portion 108A is smaller than a width or diameter 112 of wide portion 108B. Thus, opening 108 comprises a shoulder at a transition between narrow portion 108A and wide portion 108B. In some embodiments, mold protrusion 106 is seated against or engaged with the shoulder of the corresponding opening 108. For example, in the embodiments shown in FIGS. 1 and 2, wide portion 108B of opening 108 is sized to receive shank portion 106A of mold protrusion 106, and narrow portion 108A of the opening is smaller than the wide portion and the shank portion, which can prevent the mold protrusion from being introduced into the narrow portion of the opening. Such a configuration can help to ensure that each of the plurality of mold protrusions 106 is inserted into mold body 104 to substantially the same depth such that extension portions 106B of the mold protrusions extend from the mold body by substantially the same length to engage the preform along a common pressing plane. In some embodiments, openings 108 in mold body 102 extend entirely through a thickness of the mold body. Such a configuration can help to enable removal of mold protrusions 106 from mold body 102 (e.g., by pressing on the mold protrusions from the back side of the mold body).

Although openings 108 in mold body 104 are described with reference to FIGS. 1 and 2 as stepped openings, other embodiments are included in this disclosure. For example, in other embodiments, the openings in the mold body are tapered openings (e.g., with progressively smaller width or diameter moving away from the mold surface), straight openings (e.g., with substantially constant diameter), or openings with another suitable configuration. In various embodiments, the mold protrusions can have a size and shape corresponding to the size and shape of the openings in the mold body to enable the mold protrusions to be received within the openings as described herein. Although openings 108 in mold body 104 are described with reference to FIGS. 1 and 2 as extending entirely through mold body 104, other embodiments are included in this disclosure. For example, in other embodiments, the openings in the mold body are blind openings that extend from the mold surface partially through the mold body, but comprise a closed end disposed within the mold body.

In some embodiments, the plurality of mold protrusions is configured to engage a preform to form a plurality of cavities corresponding to the mold protrusions. For example, the mold protrusions, or a portion thereof, are sized and shaped to form cavities in the preform having a desired size and shape. In some embodiments, mold protrusion 106 comprises an engaging portion 106C disposed at a distal end of the mold protrusion extending away from mold body 104. For example, engaging portion 106C is all or a portion of extension portion 106B disposed at the distal end of mold protrusion 106 to engage the preform as described herein. In some embodiments, a size of engaging portion 106C of mold protrusion 106 corresponds to a desired size of the cavities to be formed in the preform upon pressing. For example, mold protrusion 106C can have a diameter or width of at most about 5 mm, at most about 4 mm, at most about 3 mm, at most about 2 mm, or at most about 1 mm. Additionally, or alternatively, mold protrusion 106C can have a diameter or width of at least about 0.5 mm or at least about 1 mm. The diameter or width of engaging portion 106C can refer to the diameter or width at a proximal end of the engaging portion and/or a distal end of the engaging portion. Such a small engaging portion and the resulting small cavities with smooth and/or straight sidewalls formed in the preform can be enabled by the methods and apparatus described herein. In some embodiments, a shape of engaging portion 106C of mold protrusion 106 has a shape corresponding to a desired shape of the cavities to be formed in the preform upon pressing. For example, in the embodiments shown in FIGS. 1 and 2, engaging portion 106C of mold protrusion 106 has a tapered or truncated conical shape. Thus, mold protrusion 106C comprises an elongate rod with a tapered distal end. In other embodiments, the engaging portion of the mold protrusion can have a cylindrical, rounded, or other suitable shape. In various embodiments, engaging portion 106C of mold protrusion 106 has an axisymmetric shape about a longitudinal axis of the mold protrusion.

In some embodiments, a number of mold protrusions in the plurality of mold protrusions corresponds to a desired number of cavities in the plurality of cavities of a shaped article as described herein. For example, the number of mold protrusions 106 in the plurality of mold protrusions can be at least 100, at least 200, at least 300, at least 400, at least 500, at least 600, at least 700, at least 800, at least 900, at least 1000, at least 1100, at least 1200, at least 1300, at least 1400, or at least 1500. The large number of mold protrusions in the plurality of mold protrusions can be enabled by the low surface roughness of the engaging portions of the mold protrusions. For example, the low surface roughness can enable pressing at a lower pressing force as described herein, which can enable an increased number of mold protrusions.

In some embodiments, engaging portion 106C of mold protrusion 106 has a surface roughness of at most about 50 nm, at most about 40 nm, at most about 30 nm, at most about 20 nm, at most about 10 nm, at most about 5 nm, or at most about 4 nm. Such a smooth engaging surface can be enabled by forming the mold protrusion from the non-porous material as described herein. Additionally, or alternatively, such a smooth engaging portion can enable formation of cavities with smooth sidewalls, which may be beneficial for applications such as liquid lenses as described herein.

Figure 3:
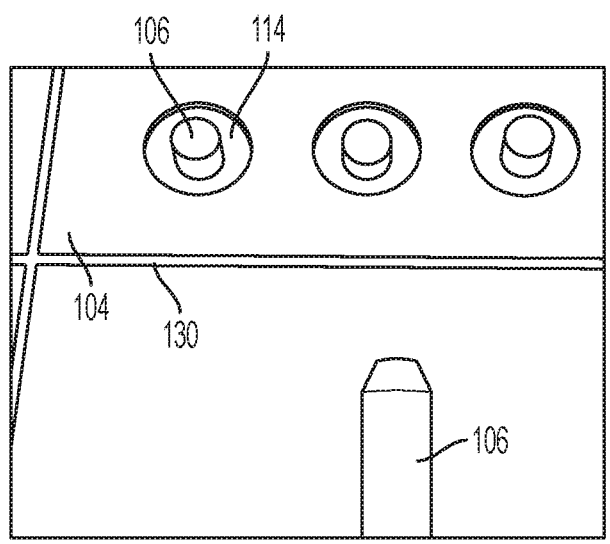
FIG. 3 is a close-up view of a portion of some embodiments of a mold and a separate mold protrusion that is not received within the mold body.

FIG. 3 is a close-up view of a portion of mold 102 and a separate mold protrusion 106 that is not received within mold body 104. In some embodiments, mold body 104 comprises an annular recess 114 surrounding each of the plurality of openings 108 in the mold body. For example, annular recess 114 is an indentation or depression in a surface of mold body 104 that partially or entirely encircles opening 108 as shown in FIG. 3. In some embodiments, annular recess 114 has a shape that is substantially the same as the shape of opening 108. For example, in the embodiments shown in FIGS. 1-3, annular recess 114 has a circular shape corresponding to the circular shape of opening 108. In other embodiments, the annular recess and the opening can have different shapes. Annular recess 114 can serve as a void into which preform material can flow during pressing as described herein, which can reduce the force required to press the preform.

Although mold body 104 and mold protrusions 106 are described with reference to FIGS. 1 and 2 as being formed from different materials, other embodiments are included in this disclosure. For example, in other embodiments, the mold body and the mold protrusions can be formed from the same or different materials. Additionally, or alternatively, the mold body and the mold protrusions can be formed as a single, integral unit or as one or more separate, distinct units coupled together.

In some embodiments, apparatus 100 comprises a backing plate 120. During pressing, the preform can be pressed between the mold and the backing plate as described herein. In some embodiments, backing plate 120 comprises a plurality of depressions 122 corresponding to the plurality of mold protrusions 106 of mold 102. For example, depression 122 is an indentation or recess in a surface of backing plate 120 that is at least partially aligned with a corresponding mold protrusion 106. In some embodiments, depression 122 has a shape that is substantially the same as the cross-sectional shape of mold protrusion 106. For example, in the embodiments shown in FIGS. 1 and 2, depression 122 has a circular shape corresponding to the circular cross-sectional shape of mold protrusion 106. In other embodiments, the depression and the mold protrusion can have different shapes. Depressions 122 can serve as voids into which preform material can flow during pressing as described herein, which can reduce the degree to which the preform sticks to mold 102 and/or reduce the force required to press the preform.

In some embodiments, backing plate 120 is formed from a porous material as described herein with reference to mold body 104. Backing plate 120 and mold body 104 can be formed from the same or different materials.

In some embodiments, apparatus 100 comprises one or more alignment pins and corresponding alignment holes, which can help to maintain alignment between mold 102 and backing plate 120 during pressing. For example, in the embodiments shown in FIGS. 1 and 2, backing plate 120 comprises a plurality of alignment pins 124, and mold 102 comprises a corresponding plurality of alignment holes 126. During pressing, alignment pins 124 can be introduced into alignment holes 126, thereby facilitating proper alignment between mold 102 and backing plate 120.

Although apparatus 100 is described with reference to FIGS. 1 and 2 as comprising alignment pins 124 on backing plate 120 and corresponding alignment holes 126 on mold 102, other embodiments are included in this disclosure. In other embodiments, the mold comprises one or more alignment pins, and the backing plate comprises one or more corresponding alignment holes. In various embodiments, alignment pins and corresponding alignment holes can be placed on one or both of the mold and the backing plate.

In some embodiments, apparatus 100 comprises one or more ribs 130 disposed on the engaging surface of mold body 104 and/or backing plate 120. For example, in the embodiments shown in FIGS. 1 and 2, mold body 104 comprises one or more ribs 130 disposed on the engaging surface of the mold body, and backing plate 120 comprises one or more corresponding ribs 130 disposed on the engaging surface of the backing plate. The ribs can form thinned segments in the preform during pressing as described herein to enable separation of the shaped article following the pressing. For example, the thinned segments can be configured as breaking lines along which the shaped article can be mechanically broken (e.g., by bending).

Figure 4:
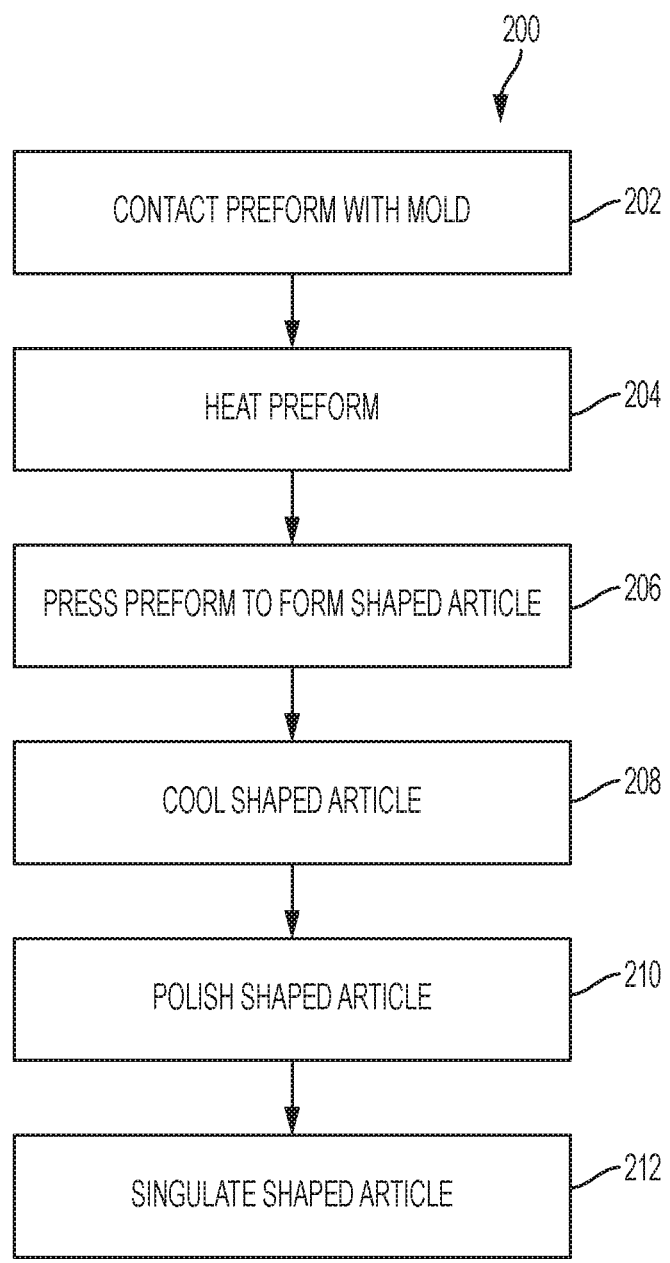
FIG. 4 is a flowchart representing some embodiments of a method for forming a shaped article.

FIG. 4 is a flowchart representing some embodiments of a method 200 for forming a shaped article. In some embodiments, method 200 comprises contacting a preform with a mold at step 202.

Figure 5:
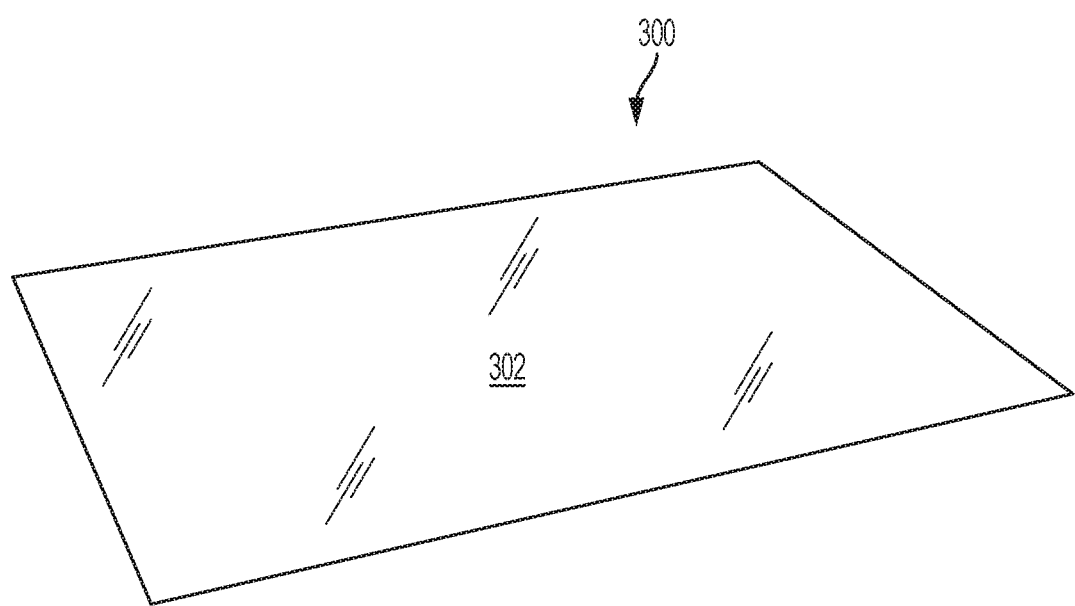
FIG. 5 is a perspective view of some embodiments of a preform.
Figure 6:
FIG. 6 is a cross-sectional view of the preform of FIG. 5.

FIG. 5 is a perspective view of some embodiments of a preform 300, and FIG. 6 is a cross-sectional view of preform 300. In some embodiments, preform 300 is configured as a sheet or plate. For example, preform 300 comprises a first surface 302 and a second surface 304 substantially parallel to the first surface. A thickness of preform 300 is a distance between first surface 302 and second surface 304. In some embodiments, preform 300 has a rectangular circumferential or perimetrical shape as shown in FIG. 5. In other embodiments, the preform can have a triangular, circular, elliptical, or other polygonal or non-polygonal circumferential or perimetrical shape. For example, the preform 300 can be a wafer having a substantially circular circumferential shape and with or without a reference flat disposed on an outer circumference or perimeter of the preform. In some embodiments, first surface 302 of preform 300 (e.g., the surface of the preform engaged by mold 102 as described herein) has a surface area of at least about 100 $cm^2$, at least about 200 $cm^2$, at least about 300 $cm^2$, at least about 400 $cm^2$, at least about 500 $cm^2$, at least about 600 $cm^2$, at least about 700 $cm^2$, at least about 800 $cm^2$, at least about 900 $cm^2$, at least about 1000 $cm^2$, at least about 1100 $cm^2$, at least about 1200 $cm^2$, at least about 1300 $cm^2$, at least about 1400 $cm^2$, or at least about 1500 $cm^2$. For example, preform can be a 6 inch wafer with a surface area of about 121.55 $cm^2$, an A6 plate with a surface area of about 155.4 $cm^2$, an 8 inch wafer with a surface area of about 162.15 $cm^2$, an A5 plate with a surface area of about 310.8 $cm^2$, an A4 plate with a surface area of about 623.7 $cm^2$, an A3 plate with a surface area of about 1247.4 $cm^2$, or another suitably sized preform with a suitable surface area. Such a large surface area can be enabled by the mold 100 described herein (e.g., by enabling increased pressing temperature and/or reduced pressing pressure). In some embodiments, preform 300 is formed from a glass material, a glass-ceramic material, or a combination thereof. For example, preform 300 is a glass sheet or plate.

In some embodiments, the contacting comprises contacting preform 300 with mold 102 described herein. For example, the contacting comprises bringing at least a portion of the mold surface (e.g., engaging portions 106C of mold protrusions 106) into contact with first surface 302 of preform 300.

In some embodiments, method 200 comprises heating the preform at step 204 as shown in FIG. 4. For example, heating preform 300 comprises heating the preform in a heating device such as an oven or a lehr. Thus, the heating can be performed as a batch process (e.g., in a static oven) or a continuous process (e.g., in a dynamic lehr). In some embodiments, the heating comprises heating preform 300 to a pressing temperature. The pressing temperature can be a temperature sufficient to cause preform 300 to soften to a desired viscosity for pressing as described herein. For example, the pressing temperature is a temperature at which preform 300 has a viscosity of at least about $10^5$ poise, at least about $10^6$ poise, or at least about $10^7$ poise. Additionally, or alternatively, the pressing temperature is a temperature at which preform 300 has a viscosity of at most about $10^{12}$ poise, at most about $10^{11}$ poise, at most about $10^{10}$ poise, at most about $10^9$ poise, or at most about $10^{8.5}$ poise. In some embodiments, the heating comprises ramping the temperature of preform 300 to the pressing temperature (e.g., from room temperature (e.g., about 20° C.) to the pressing temperature) over a ramp period. For example, the ramp period is at least about 0.5 hours, at least about 1 hour, or at least about 1.5 hours. Additionally, or alternatively, the ramp period is at most about 5 hours, at most about 4 hours, at most about 3 hours, or at most about 2.5 hours. Gradually heating the preform over the ramp period can help to avoid thermally shocking the preform.

The heating can be performed before and/or after the contacting. For example, in some embodiments, preform 300 is contacted with mold 102, and then the preform and the mold are heated together to bring the preform to the pressing temperature. In other embodiments, preform 300 is heated to an intermediate temperature (e.g., a temperature between room temperature and the pressing temperature) prior to being contacted with mold 102, and then the preform and the mold are further heated to bring the preform to the pressing temperature.

In some embodiments, method 200 comprises pressing the preform with the mold at a pressing temperature and a pressing pressure sufficient to transform the preform into a shaped article comprising a plurality of cavities corresponding to the plurality of mold protrusions. For example, the pressing comprises applying a sufficient force on mold 102 to press mold protrusions 106 into first surface 302 of preform 300, thereby forming the cavities in the preform and transforming the preform into the shaped article. For example, the pressing pressure can be about 0.1 $N/cm^2$ to about 1 $N/cm^2$. The pressing pressure can depend on the pressing temperature. For example, a higher pressing pressure may be used in combination with a lower pressing temperature (e.g., to compensate for the higher viscosity of the preform). Conversely, a lower pressing pressure may be used in combination with a higher pressing temperature (e.g., to compensate for the lower viscosity of the preform).

In some embodiments, mold 102 comprises mold body 104 formed from the porous material and mold protrusions 106 formed from the non-porous material as described herein. Such a configuration of mold 102 can enable an isothermal pressing process for producing shaped articles with high precision and/or high registration. For example, the porous material of mold body 104 can help to prevent gas entrapment during pressing and/or enable venting during mold release, or demolding.

In some embodiments, pressing the preform comprises pressing the preform between the mold and a backing plate. For example, the pressing comprises pressing preform 300 between mold 102 and backing plate 120. In some embodiments, the pressing comprises maintaining preform 300 at the pressing temperature and/or maintaining the pressing force on mold 102 for a dwell time sufficient to transform the preform into the shaped article. For example, the dwell time is at least about 5 minutes or at least about 10 minutes. Additionally, or alternatively, the dwell time is at most about 30 minutes or at most about 20 minutes.

FIG. 2 schematically illustrates some embodiments of mold 102 and preform 300 during the pressing. In some embodiments, during the pressing, engaging portions 106C of mold protrusions 106 are pressed into preform 300 as shown in FIG. 2. Such engagement and/or squeezing of preform 300 between mold 102 and backing plate 120 can cause material of the preform to flow into annular recesses 114 of mold body 104 and/or depressions 122 of the backing plate.

Figure 7:
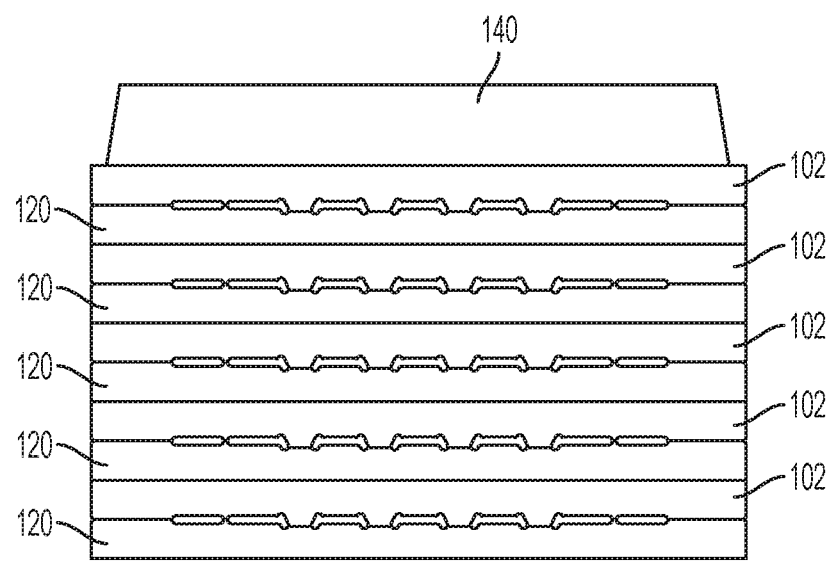
FIG. 7 is a cross-sectional schematic view of some embodiments of pressing a preform with a mold at a pressing temperature and a pressing pressure sufficient to transform the preform into a shaped article comprising a plurality of cavities corresponding to a plurality of mold protrusions.

FIG. 7 is a cross-sectional schematic view of some embodiments of the pressing. In some embodiments, apparatus 100 comprises a plurality of molds 102 and a plurality of backing plates 120 as shown in FIG. 7. Molds 102 and backing plates 120 can be arranged in an alternating stacked arrangement as shown in FIG. 7. The pressing force can be applied to the stack of molds 102 and backing plates 120. For example, the pressing force is applied by placing a weight 140 on top of the stack. Additionally, or alternatively, the pressing force is applied using a mechanical press, or another suitable pressing device. Using a plurality of molds and backing plates can enable an increase in the rate of manufacturing shaped articles.

Figure 8:
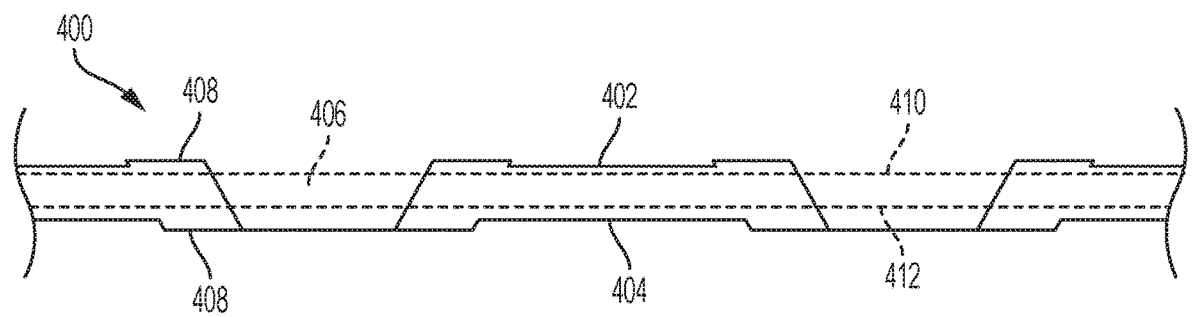
FIG. 8 is a partial cross-sectional schematic view of some embodiments of a shaped article following the pressing.

FIG. 8 is a partial cross-sectional schematic view of some embodiments of a shaped article 400 following the pressing. Shaped article 400 comprises a first surface 402 corresponding to first surface 302 of preform 300 and a second surface 404 opposite the first surface and corresponding to second surface 304 of the preform. In some embodiments, shaped article 400 comprises a plurality of cavities 406 formed in first surface 402 and corresponding to the plurality of mold protrusions 106 of mold 102. In some embodiments, cavities 406 are blind holes that do not extend entirely through shaped article 400 as shown in FIG. 8. Thus, cavities 406 comprise an open end at first surface 402 of shaped article 400 and a closed end near second surface 404 of the shaped article. In other embodiments, the cavities are through-holes extending entirely through the shaped article. Cavities 406 can have a size and shape corresponding to mold protrusions 106 (e.g., engaging surfaces 106C of the mold protrusions). For example, cavities 406 can have a diameter or width of at most about 5 mm, at most about 4 mm, at most about 3 mm, at most about 2 mm, or at most about 1 mm. Additionally, or alternatively, cavities 406 can have a diameter or width of at least about 0.5 mm or at least about 1 mm. The diameter or width of cavities 406 can refer to the diameter or width at first surface 402 of shaped article 400 and/or second surface 404 of the shaped article. Such small cavities with smooth and/or straight sidewalls can be enabled by the methods and apparatus described herein.

In some embodiments, a number of cavities 406 in the plurality of cavities corresponds to the number of mold protrusions 106 of mold 102 as described herein. For example, the number of cavities 406 in the plurality of cavities can be at least 100, at least 200, at least 300, at least 400, at least 500, at least 600, at least 700, at least 800, at least 900, at least 1000, at least 1100, at least 1200, at least 1300, at least 1400, or at least 1500.

In some embodiments, method 200 comprises cooling the shaped article at step 208 as shown in FIG. 4. For example, cooling shaped article 400 comprises cooling the shaped article in the heating device such as the oven or the lehr. Thus, the cooling can be performed as a batch process (e.g., in a static oven) or a continuous process (e.g., in a dynamic lehr). In some embodiments, the cooling comprises cooling shaped article 400 to room temperature. In some embodiments, the cooling comprises ramping the temperature of shaped article (e.g., from the pressing temperature to room temperature) over a ramp period. For example, the ramp period is at least about 0.5 hours, at least about 1 hour, or at least about 1.5 hours. Additionally, or alternatively, the ramp period is at most about 5 hours, at most about 4 hours, at most about 3 hours, or at most about 2.5 hours. Gradually cooling the shaped article over the ramp period can help to avoid thermally shocking the shaped article.

In some embodiments, following the pressing and/or the cooling, shaped article 400 comprises one or more raised portions 408 disposed on one or more surfaces of the shaped article as shown in FIG. 8. For example, first surface 402 of shaped article 400 comprises raised portions 408 corresponding to annular recesses 114 of mold body 104. Such raised portions 408 can result from flow of material of preform 300 into annular recesses 114 during the pressing. Additionally, or alternatively, second surface 404 of shaped article 400 comprises raised portions 408 corresponding to depressions 122 of backing plate 120. Such raised portions 408 can result from flow of material of preform 300 into depressions 122 during the pressing. Thus, in various embodiments, first surface 402 and/or second surface 404 are non-planar following pressing.

In some embodiments, method 200 comprises polishing the shaped article at step 210 as shown in FIG. 4. For example, polishing shaped article 400 comprises polishing at least one of first surface 402 of the shaped article or second surface 404 of the shaped article following the pressing and/or the cooling.

Figure 9:
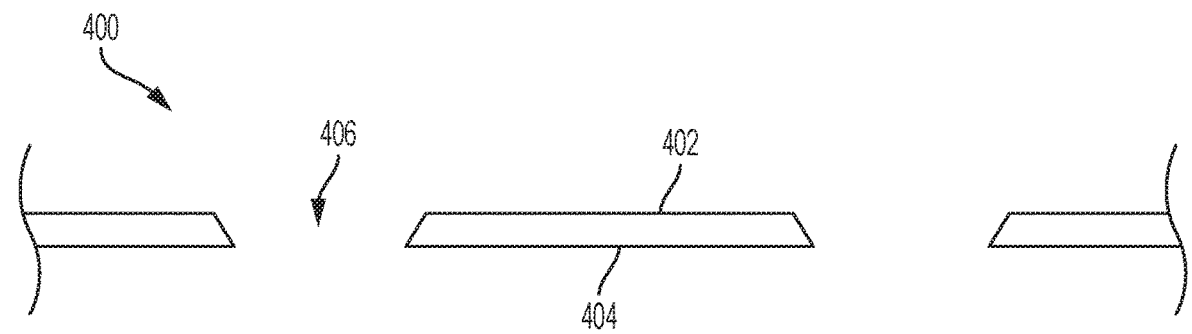
FIG. 9 is a cross-sectional schematic view of some embodiments of a shaped article following polishing.

FIG. 9 is a cross-sectional schematic view of some embodiments of shaped article 400 following the polishing. In some embodiments, the polishing comprises removing material from first surface 402 of shaped article 400. For example, the polishing comprises removing material from first surface 402 down to dashed line 410 shown in FIG. 8. Such polishing can remove raised portions 408 on first surface 402, resulting in a substantially planar surface, excluding cavities 406, as shown in FIG. 9. In some embodiments, the polishing comprises removing material from second surface 404 of shaped article 400. For example, the polishing comprises removing material from second surface 404 down to dashed line 412 shown in FIG. 8. Such polishing can remove raised portions 408 on second surface 404, resulting in a substantially planar surface, excluding cavities 406, as shown in FIG. 9. The polishing can be achieved by mechanical grinding, chemical etching, thermal treatment, or another suitable polishing process. Mechanical grinding can be beneficial in enabling removal of material from the surfaces of the shaped article without altering the sidewalls of the cavities, which can help to preserve the surface quality of the sidewalls as described herein.

In some embodiments, after the pressing and prior to the polishing, cavities 406 of shaped article 400 comprise blind holes as shown in FIG. 8 and described herein. In some of such embodiments, the polishing opens the blind holes to transform the plurality of cavities 406 into a plurality of through-holes as shown in FIG. 9. For example, the polishing removes the closed end of the blind holes to open the blind holes and form the through-holes.

In some embodiments, the polishing does not affect the surfaces of the sidewalls of cavities 406. Thus, before and after the polishing, the sidewalls are unpolished sidewalls. In some embodiments, the sidewalls of cavities 406 of shaped article 400 have an unpolished or as-pressed surface roughness (e.g., following the pressing, the cooling, and/or the polishing) of at most about 120 nm, at most about 110 nm, at most about 100 nm, at most about 90 nm, at most about 80 nm, at most about 70 nm, at most about 60 nm, at most about 50 nm, at most about 40 nm, at most about 30 nm, at most about 20 nm, or at most about 10 nm. Additionally, or alternatively, the sidewalls of cavities 406 of shaped article 400 have an unpolished or as-pressed surface roughness of at least about 5 nm, at least about 10 nm, or at least about 20 nm. Such a smooth surface can be enabled by the smoothness of engaging portion 106C of mold protrusion 106, which can be enabled by the non-porous material from which mold 102 can be formed. In some embodiments, the sidewalls of cavities 406 of shaped article 400 are substantially straight. For example, the deviation of the sidewalls of cavities 406 from linear is within +/−0.25 μm over 1 mm along the sidewall through a thickness of shaped article 400. In some embodiments, cavities 406 have a truncated conical shape with smooth and substantially straight sidewalls.

In some embodiments, a thickness of shaped article 400 (e.g., a distance between first surface 402 and second surface 404), before or after polishing, can be at most about 5 mm, at most about 4 mm, at most about 3 mm, at most about 2 mm, at most about 1 mm, at most about 0.9 mm, at most about 0.8 mm, at most about 0.7 mm, at most about 0.6 mm, or at most about 0.5 mm. Additionally, or alternatively, the thickness of shaped article 400, before or after polishing, can be at least about 0.1 mm, at least about 0.2 mm, at least about 0.3 mm, at least about 0.4 mm, at least about 0.5 mm, at least about 0.8 mm, at least about 0.9 mm, or at least about 1 mm.

Figure 10:
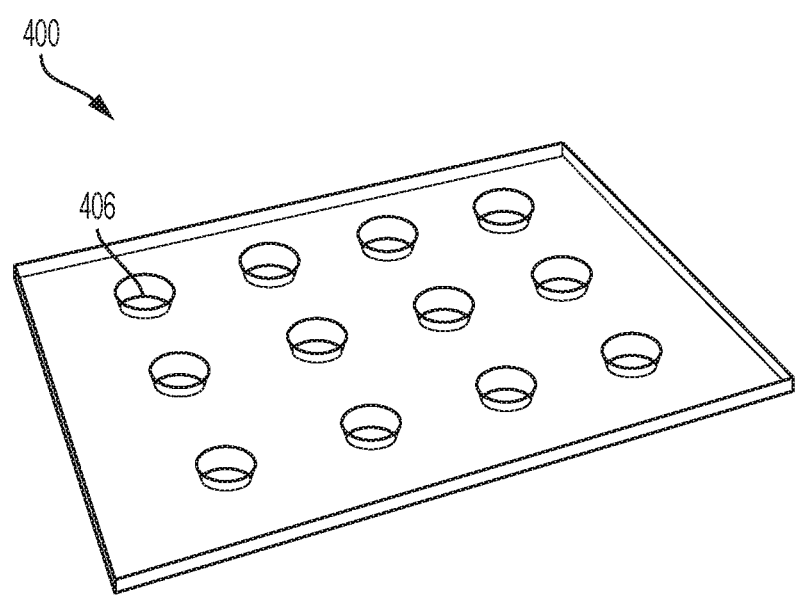
FIG. 10 is a perspective view of some embodiments of a shaped sub-article formed by breaking a shaped article along a plurality of cutting paths.

In some embodiments, method 200 comprises singulating the shaped article at step 212 as shown in FIG. 4. For example, singulating shaped article 400 comprises separating the shaped article into two or more shaped sub-articles following the pressing, the cooling, and/or the polishing. In some embodiments, shaped article 400 comprises one or more cutting paths formed therein. For example, the cutting paths are thinned regions of shaped article 400 formed by ribs 130 of mold 102 and/or backing plate 120. In some of such embodiments, singluating shaped article 400 comprises cutting or breaking the shaped article along the cutting paths. For example, FIG. 10 is a perspective view of some embodiments of a shaped sub-article 400A formed by breaking shaped article 400 along a plurality of cutting paths. In some embodiments, singulating shaped article 400 comprises dicing the shaped article (e.g., with a mechanical dicing saw, a laser, or another suitable cutting device). For example, the singulating comprises dicing shaped article 400 to form a plurality of shaped sub-articles, and each sub-article comprises a single cavity 406. Such shaped sub-articles can be used to form liquid lenses as described herein.

Figure 11:
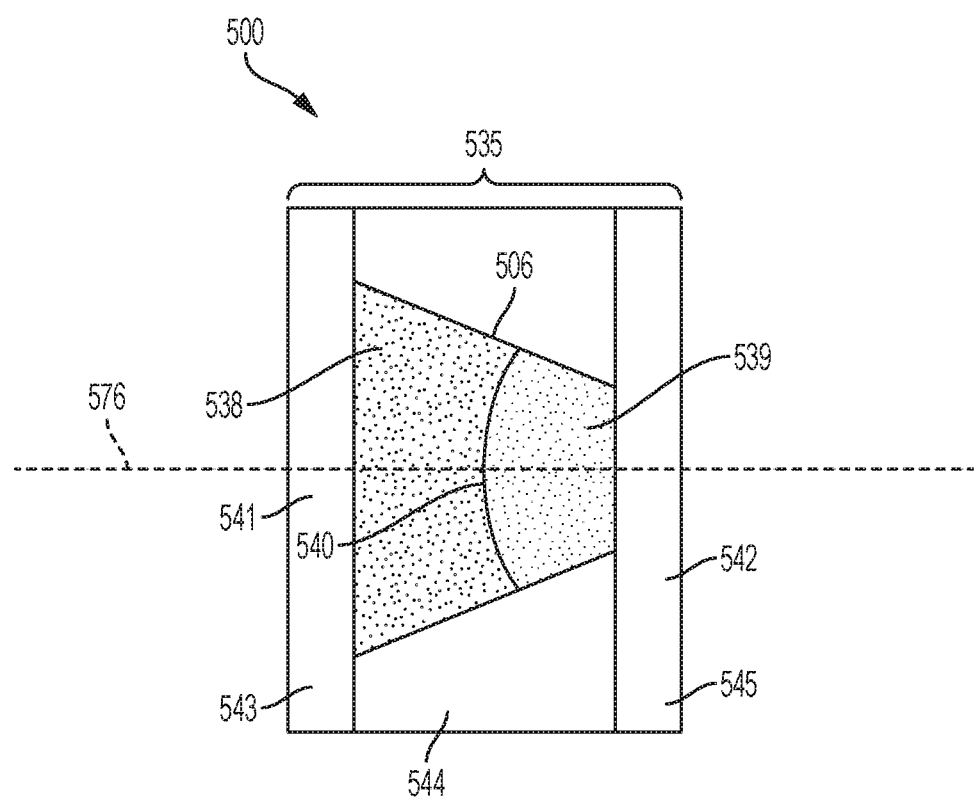
FIG. 11 is a cross-sectional schematic view of some embodiments of a liquid lens incorporating a shaped article.

In some embodiments, the methods and apparatus described herein can be used to manufacture liquid lenses. FIG. 11 is a cross-sectional schematic view of some embodiments of a liquid lens 500 incorporating shaped article 400. In some embodiments, liquid lens 500 comprises a lens body 535 and a cavity 506 formed in the lens body. A first liquid 538 and a second liquid 539 are disposed within cavity 506. In some embodiments, first liquid 538 is a polar liquid or a conducting liquid. Additionally, or alternatively, second liquid 539 is a non-polar liquid or an insulating liquid. In some embodiments, first liquid 538 and second liquid 539 are immiscible with each other and have different refractive indices such that an interface 540 between the first liquid and the second liquid forms a lens. Interface 540 can be adjusted via electrowetting. For example, a voltage can be applied between first liquid 538 and a surface of cavity 506 (e.g., an electrode positioned near the surface of the cavity and insulated from the first liquid) to increase or decrease the wettability of the surface of the cavity with respect to the first liquid and change the shape of interface 540. In some embodiments, adjusting interface 540 changes the shape of the interface, which changes the focal length or focus of liquid lens 500. For example, such a change of focal length can enable liquid lens 500 to perform an autofocus (AF) function. Additionally, or alternatively, adjusting interface 540 tilts the interface relative to an optical axis 576. For example, such tilting can enable liquid lens 500 to perform an optical image stabilization (OIS) function. Such adjustment of interface 540 via electrowetting can be sensitive to surface roughness and/or non-linearity of the sidewalls of cavity 506. Thus, the methods and apparatus described herein for forming shaped article 400 having cavities 506 with smooth and/or substantially straight sidewalls may be beneficial for forming cavity 506 for liquid lens 500. In some embodiments, first liquid 538 and second liquid 539 have substantially the same density, which can help to avoid changes in the shape of interface 540 as a result of changing the physical orientation of liquid lens 500 (e.g., as a result of gravitational forces).

In some embodiments, lens body 535 of liquid lens 500 comprises a first window 541 and a second window 542. In some of such embodiments, cavity 506 is disposed between first window 541 and second window 542. In some embodiments, lens body 535 comprises a plurality of layers that cooperatively form the lens body. For example, in the embodiments shown in FIG. 11, lens body 535 comprises a cap 543, a shaped plate 544, and a base 545. In some embodiments, shaped plate 544 with cavity 506 comprises or is formed from shaped article 400 with cavity 406. For example, shaped plate 544 with cavity 506 is formed as described herein with reference to shaped article 400 with cavity 406, cap 543 is bonded to one side (e.g., an object side) of the shaped plate, and base 545 is bonded to the other side (e.g., an image side) of the shaped plate such that the cavity is covered on opposing sides by the cap and the base. Thus, a portion of cap 543 covering cavity 506 serves as first window 541, and a portion of base 545 covering the cavity serves as second window 542. In other embodiments, the cavity is a blind hole that does not extend entirely though the shaped plate. In such embodiments, the base can be omitted, and the closed end of the cavity can serve as the second window.

In some embodiments, cavity 506 has a truncated conical shape as shown in FIG. 11 such that a cross-sectional area of the cavity decreases along optical axis 576 in a direction from the object side to the image side. Such a tapered cavity can help to maintain alignment of interface 540 between first liquid 538 and second liquid 539 along optical axis 576. In other embodiments, the cavity is tapered such that the cross-sectional area of the cavity increases along the optical axis in the direction from the object side to the image side or non-tapered such that the cross-sectional area of the cavity remains substantially constant along the optical axis.

In some embodiments, image light enters liquid lens 500 through first window 541, is refracted at interface 540 between first liquid 538 and second liquid 539, and exits the liquid lens through second window 542. In some embodiments, cap 543 and/or base 545 comprise a sufficient transparency to enable passage of image light. For example, cap 543 and/or base 545 comprise a polymeric material, a glass material, a ceramic material, a glass-ceramic material, or a combination thereof. In some embodiments, outer surfaces of cap 543 and/or base 545 are substantially planar. Thus, even though liquid lens 500 can function as a lens (e.g., by refracting image light passing through interface 540), outer surfaces of the liquid lens can be flat as opposed to being curved like the outer surfaces of a fixed lens. In other embodiments, outer surfaces of the cap and/or the base are curved. Thus, the liquid lens comprises an integrated fixed lens. In some embodiments, shaped plate 544 comprises a glass material, a glass-ceramic material, or a combination thereof as described herein. Because image light can pass through the cavity through shaped plate 544, the shaped plate may or may not be transparent.

Although FIG. 11 illustrates a single liquid lens 500, liquid lenses can be manufactured in arrays using a wafer manufacturing process as described herein. For example, a liquid lens array comprises a plurality of liquid lenses 500 attached in a plate or wafer. Thus, prior to singulation to form single liquid lens 500, shaped plate 544 comprises a plurality of cavities 506. Additionally, or alternatively, prior to singulation, cap 543 comprises a plate with a plurality of first windows 541 corresponding to the plurality of cavities 506. Additionally, or alternatively, prior to singulation, base 545 comprises a plate with a plurality of second windows 542 corresponding to the plurality of cavities 506. After formation, the liquid lens array can be singulated to form the individual liquid lenses 500.

Figure 12:
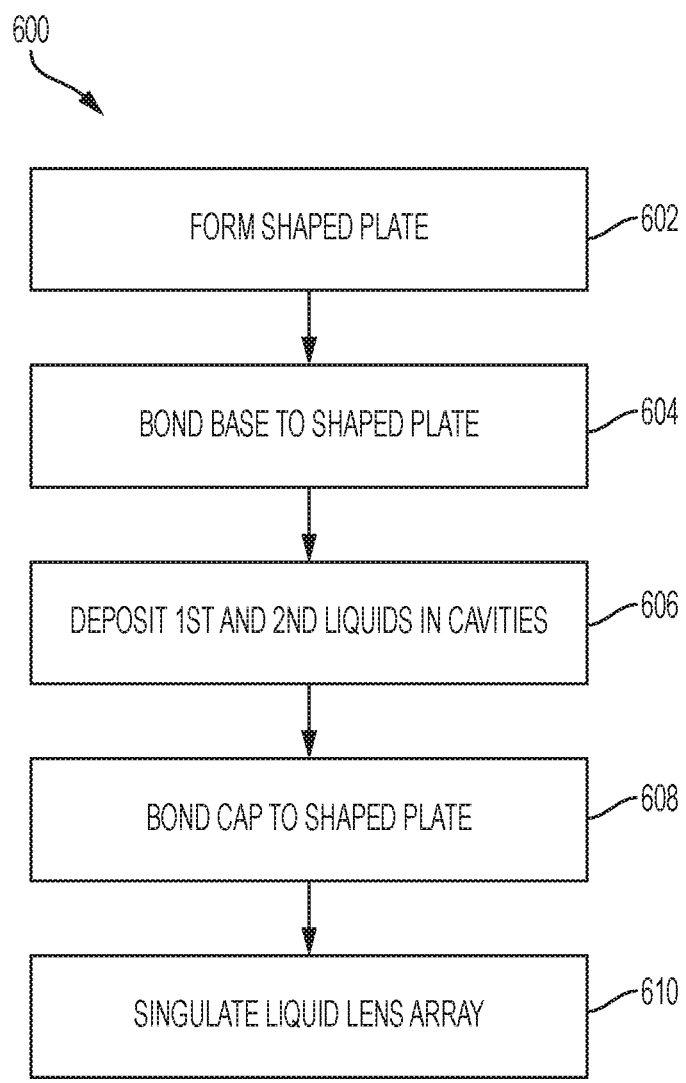
FIG. 12 is a flowchart representing some embodiments of a method for manufacturing a liquid lens.

FIG. 12 is a flowchart representing some embodiments of a method 600 for manufacturing a liquid lens. In some embodiments, method 600 comprises forming a shaped plate comprising a plurality of cavities. For example, method 600 comprises forming shaped plate 544 comprising the plurality of cavities 506 at step 602 (e.g., as described herein with reference to forming shaped article 400 comprising the plurality of cavities 406).

In some embodiments, method 600 comprises bonding a base to a surface of the shaped plate. For example, method 600 comprises bonding base 545 to shaped plate 544 at step 604. The bonding comprises, for example, laser bonding, adhesive bonding, or another suitable bonding technique.

In some embodiments, method 600 comprises depositing first and second liquids into the plurality of cavities of the shaped plate. For example, method 600 comprises depositing first liquid 538 and second liquid 539 in each of the plurality of cavities 506 of shaped plate 544 at step 606.

In some embodiments, method 600 comprises bonding a cap to a surface of the shaped plate to seal the first liquid and the second liquid within the plurality of cavities and form a liquid lens array. For example, method 600 comprises bonding cap 543 to shaped plate 544 to seal first liquid 538 and second liquid 539 within the plurality of cavities 506 of the shaped plate 608. The bonding comprises, for example, laser bonding, adhesive bonding, or another suitable bonding technique.

In some embodiments, method 600 comprises singulating the liquid lens array to form a plurality of individual liquid lenses. For example, method 600 comprises singulating the liquid lens array comprising cap 543, shaped plate 544, and optionally, base 545 to form the plurality of individual liquid lenses 500 at step 610. The singulating comprises, for example, mechanical dicing, laser dicing, or another suitable dicing technique.

The methods and apparatus described herein for forming shaped articles with a plurality of cavities formed therein can enable large-scale production of shaped plates having cavities with sufficiently smooth surfaces to be used in electrowetting applications, which in turn, can enable efficient manufacturing of liquid lens arrays and/or singulated liquid lenses.

Although FIG. 12 illustrates using the methods and apparatus described herein to manufacture liquid lenses, other embodiments are included in this disclosure. For example, in other embodiments, the methods and apparatus described herein can be used to make shaped articles for use in optics, biological, microfluidic, or any other suitable applications.

In some embodiments, a shaped article comprises a plate comprising a glass material, a glass-ceramic material, or a combination thereof and a plurality of cavities formed in the plate. In some of such embodiments, an unpolished sidewall of each of the plurality of cavities has a surface roughness of less than or equal to 120 nm. Additionally, or alternatively, the plate comprises a first surface and a second surface opposite the first surface, and the first surface of the plate has an area of at least about 100 cm². Additionally, or alternatively, each of the plurality of cavities has a truncated conical shape. Additionally, or alternatively, the sidewall of each of the plurality of cavities is substantially straight.

It will be apparent to those skilled in the art that various modifications and variations can be made without departing from the spirit or scope of the claimed subject matter. Accordingly, the claimed subject matter is not to be restricted except in light of the attached claims and their equivalents.

What is claimed is:

1. A method of forming a shaped article comprising: pressing a preform with a mold comprising a mold body and a plurality of mold protrusions extending from the mold body at a pressing temperature and a pressing pressure sufficient to transform the preform into a shaped article comprising a plurality of cavities corresponding to the plurality of mold protrusions; wherein the preform comprises a glass material, a glass-ceramic material, or a combination thereof, wherein the mold body comprises a porous material; wherein the plurality of mold protrusions comprises a non-porous material, and wherein the plurality of mold protrusions has a surface roughness of less than or equal to 120 nm.

2. The method of claim 1, wherein the porous material of the mold body is graphite.

3. The method of claim 1, wherein the non-porous material of the plurality of mold protrusions is glass-like carbon, tungsten carbide, zirconia, yttrium-stabilized zirconia, or a combination thereof.

4. The method of claim 1, wherein sidewalls of the plurality of cavities of the shaped article have a surface roughness of less than or equal to 120 nm after the pressing and without subsequent polishing.

5. The method of claim 1, wherein the pressing comprises pressing the preform between the mold and a backing plate comprising a plurality of depressions corresponding to the plurality of mold protrusions.

6. The method claim 1, further comprising polishing at least one of a first surface or a second surface of the shaped article following the pressing, wherein prior to the polishing, the plurality of cavities are blind holes, and the polishing opens the blind holes to form a plurality of through holes.

7. The method of claim 1, wherein the pressing temperature is a temperature at which the preform has a viscosity of about $10^7$ poise to about $10^9$ poise.

8. The method of claim 1, wherein the pressing pressure is about 0.1 N/cm² to about 1 N/cm².

9. The method of claim 1, wherein the preform is a plate, and a surface of the plate engaged by the mold has an area of at least about 100 cm².

10. The method of claim 1, wherein the mold body consists essentially of graphite, and the plurality of mold protrusions consists essentially of glass-like carbon.

11. An apparatus for pressing a plurality of cavities in a preform, the apparatus comprising: a mold body comprising a porous material; and a plurality of mold protrusions extending from the mold body and comprising a non-porous material, wherein the mold body comprises a plurality of openings therein; and each of the plurality of mold protrusions is a pin comprising a shank portion disposed within a corresponding one of the plurality of openings in the mold body and an extension portion disposed outside the corresponding one of the plurality of openings in the mold body and extending from the mold body.

12. The apparatus of claim 11, wherein: each of the plurality of openings in the mold body comprises a shoulder; and each of the plurality of mold protrusions is seated against the shoulder of the corresponding one of the plurality of openings in the mold body.

13. The apparatus of claim 11, wherein an end of the extension portion of each of the plurality of mold protrusions has a truncated conical shape.

14. The apparatus of claim 11, wherein the mold body comprises an annular recess surrounding each of the plurality of openings in the mold body.

15. The apparatus of claim 11, wherein the mold body consists essentially of graphite, and the plurality of mold protrusions consists essentially of glass-like carbon.

16. A method of manufacturing a liquid lens, the method comprising:

pressing a preform with a mold comprising a mold body and a plurality of mold protrusions extending from the mold body at a pressing temperature and a pressing pressure sufficient to transform the preform into a shaped plate comprising a plurality of cavities corresponding to the plurality of mold protrusions, the preform comprising a glass material, a glass-ceramic material, or a combination thereof, the mold body comprising a porous material, and the plurality of mold protrusions comprising a non-porous material;

depositing a first liquid and a second liquid in each of the plurality of cavities of the shaped plate, the first liquid and the second liquid substantially immiscible with each other and having different refractive indices such that an interface between the first liquid and the second liquid forms a lens;

bonding a cap to a first surface of the shaped plate and a base to a second surface of the shaped plate to seal the first liquid and the second liquid within the plurality of cavities of the shaped plate and form a liquid lens array.

17. The method of claim 16, comprising:

polishing the second surface of the shaped plate opposite the surface of the shaped plate, wherein prior to the polishing, the plurality of cavities of the shaped plate are blind holes, and the polishing opens the blind holes to form a plurality of through holes in the shaped plate; and wherein bonding the base to the second surface of the shaped plate is subsequent to polishing the second surface of the shaped plate and prior to the depositing the first liquid and the second liquid in each of the plurality of cavities of the shaped plate.

18. The method of claim 16, comprising singulating the liquid lens array to form a plurality of individual liquid lenses.

* * * * *